(12) United States Patent
Reed et al.

(10) Patent No.: US 7,038,423 B2
(45) Date of Patent: May 2, 2006

(54) APPARATUS AND METHOD FOR RIDE THROUGH FOR AC INDUCTION MOTORS

(75) Inventors: Thomas A. Reed, Toledo, OH (US); Douglas A. Wittenmyer, Maumee, OH (US)

(73) Assignee: Bay Controls, Inc., Maumee, OH (US)

( * ) Notice: Subject to any disclaimer, the term of this patent is extended or adjusted under 35 U.S.C. 154(b) by 6 days.

(21) Appl. No.: 10/945,219

(22) Filed: Sep. 20, 2004

(65) Prior Publication Data

US 2005/0248308 A1    Nov. 10, 2005

Related U.S. Application Data

(60) Provisional application No. 60/569,012, filed on May 7, 2004.

(51) Int. Cl.
*H02P 1/26* (2006.01)

(52) U.S. Cl. ............... 318/729; 318/727; 318/800; 702/38; 702/60

(58) Field of Classification Search ............... 318/806, 318/439, 800, 805, 729; 361/23, 33, 94, 361/96, 97, 92, 85; 702/38, 60, 64
See application file for complete search history.

(56) References Cited

U.S. PATENT DOCUMENTS

| | | | |
|---|---|---|---|
| 2,068,600 A | | 1/1937 | Frese |
| 3,875,463 A | | 4/1975 | Reuter et al. |
| 4,354,216 A | * | 10/1982 | Volta ............................ 361/92 |
| 4,379,317 A | * | 4/1983 | Conroy et al. ................. 361/85 |
| 4,384,243 A | * | 5/1983 | Muskovac ................... 318/729 |
| 4,414,601 A | * | 11/1983 | Conroy, Jr. ................... 361/97 |
| 4,459,528 A | | 7/1984 | Nola |
| 4,990,057 A | | 2/1991 | Rollins |
| 5,434,738 A | * | 7/1995 | Kurszewski et al. .......... 361/23 |
| 5,510,687 A | | 4/1996 | Ursworth et al. |
| 5,521,482 A | * | 5/1996 | Lang et al. .................. 318/800 |
| 5,524,083 A | * | 6/1996 | Horne et al. ................. 700/293 |

(Continued)

FOREIGN PATENT DOCUMENTS

EP    0 419 761 A2    4/1991

(Continued)

OTHER PUBLICATIONS

M.D. McCulloch, The Effect of Voltage Dips On Induction Motors, DIP-Proofing Technologies, Inc., Power Quality Paper #3, approximately 1980, DIP Binder Rev. 1.0.

*Primary Examiner*—Paul Ip
(74) *Attorney, Agent, or Firm*—Fraser Martin Buchanan Miller LLC; James D. Miller

(57) ABSTRACT

A method and an apparatus for controlling ride through of an induction motor by detecting a power loss from a power supply connected to the induction motor, disconnecting the induction motor from the power supply, monitoring a line voltage of the power supply, monitoring a back emf voltage generated by the induction motor and monitoring a phase differential between the line voltage and the back emf voltage. It is determined whether the monitored voltages are within a predetermined voltage limit and the phase differential is within a predetermined phase limit and the power supply is re-connected to the induction motor in response to the monitored voltages being within the predetermined voltage limit and the monitored phase differential being within the predetermined phase limit.

18 Claims, 6 Drawing Sheets

U.S. PATENT DOCUMENTS

| | | |
|---|---|---|
| 6,068,447 A | 5/2000 | Foege |
| 6,236,179 B1 * | 5/2001 | Lawler et al. .............. 318/439 |
| 6,236,947 B1 * | 5/2001 | Dowling et al. .............. 702/38 |
| 6,411,065 B1 | 6/2002 | Underwood et al. |
| 2003/0078742 A1 * | 4/2003 | VanderZee et al. ........... 702/60 |

FOREIGN PATENT DOCUMENTS

| | | |
|---|---|---|
| EP | 0 469 177 A1 | 2/1992 |
| GB | 2 114 390 A | 8/1983 |
| JP | 2 119599 | 5/1990 |

* cited by examiner

APPARATUS AND METHOD FOR RIDE THROUGH FOR AC INDUCTION MOTORS

CROSS-REFERENCE TO RELATED APPLICATION

This application claims the benefit of U.S. provisional patent application Ser. No. 60/569,012 filed May 7, 2004.

BACKGROUND OF THE INVENTION

The present invention relates in general to a ride-through performance of induction motors. Three phase induction motors are rotor based electric motors having a fixed stator that is positioned about the perimeter of the rotor.

To operate the induction motor, portions of the stator field are consecutively energized thereby inducing an electromagnetic field about the rotor which field rotates at a slower speed than the rotating magnetic field of the stator. Three phase induction motors are typically used to drive rotating equipment, however, induction motors are sensitive to power fluctuations. Power fluctuations or momentary power interruptions are a momentary loss of power quickly followed by a restoration of power which may inturn result in damage to the motor. Causes of such power fluctuations may be due to weather effects on the power transmission line equipment, from buss transfers clearing other faults on transmission lines, from switching of generation sources at the power utility, or from internal buss transfers such as the switching to backup generator systems. These momentary power interruptions cause insufficient power flow or lack of power flow to the induction motor. During a momentary loss of power, the induction motor may act as a generator while the rotor remains rotating. If the power is re-established to the induction motor while the rotor is still rotating, damage may result to the induction motor in the form of stress and negative torque as a result of the phase differential between the line voltage and the motor generated back emf generated voltage. The stator end windings and the rotor shorting rings are exposed to excessive stress. This excessive stress, although not a threat of immediate failure, often emerges as the cause of accelerated motor wear and reduced motor life.

The most significant damage from momentary power outages is the direct result of large transient torques. Transient torques up to twelve times a full load torque (or twenty times a full load torque if power correction capacitors are used) can be experienced as the result of a momentary power outage. The large transient torques that result from the momentary power outage may be negative at times at times thereby attempting to reverse the direction of rotation of the motor and driven equipment. Such large transient torques which typically exceed the structural design limitations of a motor and associated equipment, can cause immediate catastrophic failure.

Common methods currently used to prevent damage to the motor and associated equipment during a momentary power outage disconnect the motor from the supply power and prevent the reconnection of the power supply until the motor has stopped. After the induction motor is de-energized and the rotor has stopped rotating, power is then reconnected to re-energize the induction motor. This typically requires that all equipment operating from a common control unit or power source is shut down until all induction motors have ceased rotational operation so that damage does not occur to the motor and the equipment driven by the motor. However, manufacturing facilities utilize equipment using induction motors which are required to continuously operate to maintain production rates. Typically, if a portion of the plant or process is shutdown to prevent damage to the induction motor and associated equipment, the entire manufacturing facility must be shutdown in an orderly manner to prevent any damage the respective equipment. Since a majority of momentary power outages are caused by transmission problems, often equipment in all or major portions of the plant or process are affected simultaneously. This is a time consuming and inefficient operation for a facility to have to completely shut down a portion or all of its operation each time a power fluctuation or power loss is present.

Another method of controlling damage to the induction motor and associated equipment during times of momentary power outages is to use an uninterruptible power supply that provides power from a battery and inverter during the momentary power outage. This basically eliminates the power outage as seen by the equipment. However, such uninterruptible power supplies are typically used with very small motors due to the problems of having to supply large amounts of power from one or more batteries while maintaining a respective state of charge for powering the equipment. Due to the relatively large cost, the use of uninterruptible power supplies to provide the large amounts of power as required by the equipment is not considered practical for most three phase induction motor applications.

SUMMARY OF THE INVENTION

The present invention concerns a method for controlling ride through of an induction motor comprising the steps of: a) detecting a power loss from a power supply connected to the induction motor; b) disconnecting the induction motor from the power supply; c) monitoring a line voltage of the power supply; d) monitoring a back emf voltage generated by the induction motor; e) monitoring a phase differential between the line voltage and the back emf voltage; f) determining whether the monitored voltages are within a predetermined voltage limit; g) determining whether the phase differential is within a predetermined phase limit; and h) re-connecting the power supply to the induction motor in response to the monitored voltages being within the predetermined voltage limit and the monitored phase differential being within the predetermined phase limit.

The power supply provides and the induction motor operates on three phase alternating current electrical power and said steps c) and d) are performed for each of the three phases. The method includes providing a microprocessor and operating the microprocessor to perform said steps f) and g). The steps b) and h) are performed by opening and closing respectively motor starter contacts. The step a) can be performed by comparing one of a supply phase voltage with a predetermined supply dropout voltage value and a supply phase voltage delta with a predetermined supply event voltage delta. The step b) is performed when the supply phase voltage is less than the predetermined supply dropout voltage value or the supply phase voltage delta is greater than the predetermined supply event voltage delta.

The method includes determining a phase target adjustment value representing an amount of time to compensate for an operating time of a contactor connected between the power supply and the induction motor. The step h) is performed when a supply phase voltage is greater than a predetermined supply reconnect voltage and a motor back emf voltage is less than a predetermined motor reconnect voltage. The step h) can be performed when a phase angle delta is greater than a predetermined motor reconnect minimum phase delta and the phase angle delta is less than a predetermined motor reconnect maximum phase delta.

The method includes generating a run signal during a ride through event to prevent a supervisory equipment controller from shutting down equipment coupled to the induction motor. The method also includes generating a ready to start signal when the induction motor is stopped and all phases of the power supply voltage are equal to or greater than a predetermined supply dropout voltage.

An apparatus according to the present invention for controlling ride through of an induction motor comprises: voltage sensing means adapted to be connected to power lines between a power supply and an induction motor; and control means connected to the voltage sensing means and adapted to control contactors in the power lines whereby when the voltage sensing means is connected to the power lines and the control means is connected to the contactors. The control means responds to a power loss detected by the voltage sensing means by operating the contactors to disconnect the power supply from the induction motor, and the voltage sensing means monitors a line voltage of the power supply, a back emf voltage generated by the induction motor and a phase differential between the line voltage and the back emf voltage such that the control mean re-connects the power supply to the induction motor when the monitored voltages are within a predetermined voltage limit and the monitored phase differential is within a predetermined phase limit. The voltage sensing means includes a supply voltage sensing circuit for monitoring the line voltage and a motor voltage sensing circuit for monitoring the back emf voltage. At least one of the supply voltage sensing circuit and the motor voltage sensing circuit includes a low pass filter, a full-wave rectified circuit and a differential amplifier for generating an output signal representing monitored voltage.

At least one of the supply voltage sensing circuit and the motor voltage sensing circuit includes a circuit for generating a half wave output signal representing monitored voltage. The voltage sensing means includes a phase detection circuit for monitoring a phase of the line voltage and a phase of the back emf voltage. The phase detection circuit includes first and second comparator circuits receiving the line voltage and the back emf voltage respectively and an XNOR logic gate receiving outputs from said first and second comparator circuits for generating in-phase and out-of-phase signals. The apparatus can include an uninterruptible power supply connected between the control means and at least one of the power supply and the induction motor for supplying electrical power to the control means during a power loss.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
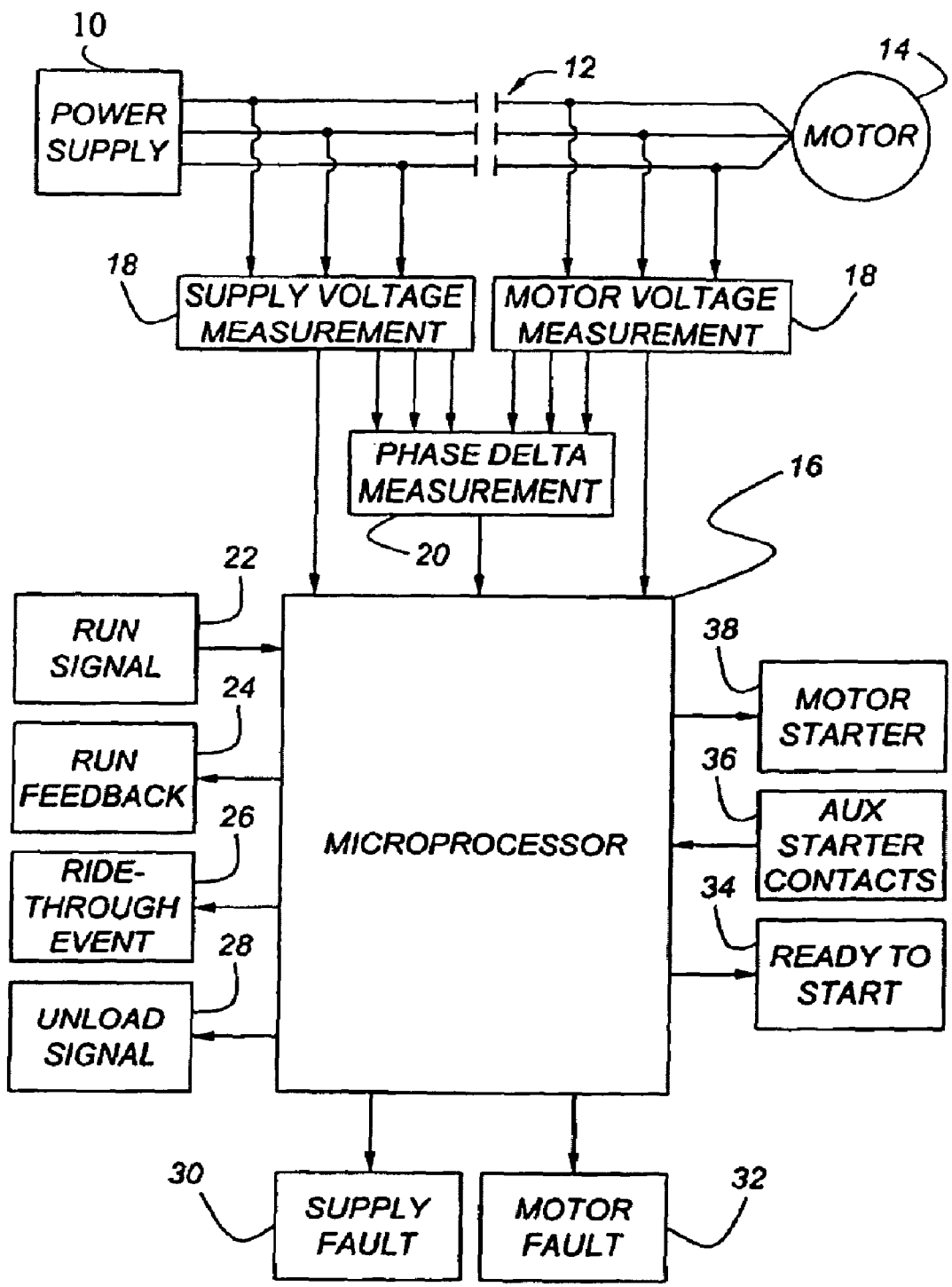
FIG. 1 is a block diagram of a digital processing circuit for providing ride-through capability to an induction motor according to a first embodiment of the present invention.

There is shown in FIG. 1 a block diagram of a method and apparatus for providing ride-through capability to an induction motor according to the present invention. A power supply 10 is provided for supplying a three-phase high voltage electrical power input to an electromechanical rotary machine such as an AC induction motor 14. The AC induction motor 14 commonly includes a rotor having a laminated core that is slotted axially. Copper or aluminum wire is embedded within the slots forming turns. A stator is disposed about the periphery of rotor laminated core separated by an air gap of a predetermined width. Stator windings of the stator are energized which generates an electric field about the rotor. The rotor rotates in response to the excited stator field. An output torque is produced on the rotor shaft for driving respective rotating driven equipment.

At least one contactor 12 is disposed between the power supply 10 and the AC induction motor 14 for disconnecting and reconnecting the supply voltage to the AC induction motor 14. If a three-phase induction motor is energized by a three-phase power supply, the contactor 12 will include three sets of main contacts. Main contacts are typically high voltage, high current rated, make and break circuits. The contactor 12 is used to make and break the electrical circuit between the power supply 10 and the AC induction motor 14. As a result, all three phases of the electrical circuit between the power supply 10 and the AC induction motor 14 may be disconnected when required.

A voltage sensing circuit 18 is electrically connected to each voltage circuit between the power supply 10 and contactor 12 for measuring the supply phase voltage, and also between the AC induction motor 14 and the contactor 12 for measuring the motor phase voltage. The sensing circuit 18 senses the supply voltage provided from the power supply 10 and any back emf voltage generated by the AC induction motor 14. The sensing circuit 18 may be an integrated sensing circuit or more than one sensing circuit for sensing the supply voltage and the motor generated back emf voltage. The voltages sensed are used as control inputs for determining when a momentary power outage is occurring for breaking the contactor 12 to disconnect the supply voltage to the AC induction motor 14 and for determining conditions under which the AC induction motor 14 can be re-connected to the supply voltage while the motor is still rotating without producing any negative affects from damaging transient torque spikes. The motor generated back emf voltage is the result of the AC induction motor 14 acting as a generator while rotation of the rotor continues after the supply voltage from the power supply 10 has been disconnected from the AC induction motor 14. The motor generated back emf voltage is a function of inertia and time.

A phase detection circuit 20 is also electrically connected to each phase circuit between the power supply 10 and the contactor 12, and also between the AC induction motor 14 and the contactor 12. The phase detection circuit 20 is utilized for determining the phase delta between the line voltage of the power supply 10 and the motor generated back emf voltage. This determination is an additional control input used to determine whether the power supply 10 is in-phase with the AC induction motor 14 so that the power supply 10 can be re-connected to the AC induction motor 14 while still rotating without producing any negative affects.

Both measurements from the voltage sense circuit 18 and the phase detection circuit 20 are input to a microprocessor-based ride-through controller 16 utilizing high speed analog to digital converters. The inputs are digitally processed within the controller 16 for: (1) determining if a momentary power outage is occurring; (2) providing a signal to open the contactors of a motor starter; (3) determining the current operating conditions; and (4) determining whether the contactors can be closed for engaging the motor starter while the motor is still rotating. This concept provides the capability of disconnecting the AC induction motor 14 from the supply voltage upon detecting the momentary power outage and reconnecting the AC induction motor 14 to the supply voltage when the momentary power outage has ended without the potential for damage due to large transient torques or electromagnetic stresses. Utilizing digital signal processing provides noise rejection, voltage measurements, phase angle and phase delta measurement of each phase of the supply voltage and motor generated back emf voltage.

Since a majority of momentary power outages are typically ten seconds or less in duration, the AC induction motor 14 and associated equipment can "ride-through" the momentary power outage without noticeable interruptions within the manufacturing operations. However, in the event the outage is of a longer duration than ten seconds, the ride-through device provides the capability of re-engaging a motor starter 38 as soon as power is restored without the need to completely stop the rotation of the AC induction motor 14 before restarting. When restarting the AC induction motor 14 and loading the associated equipment, excessive startup torques must be avoided. Typically associated equipment utilizing air compressors is started in an unloaded state and is only loaded when nominal motor speed is achieved. The ride-through device coordinates the unloading of the associated equipment to increase the period of time that the motor and the associated equipment will continue to rotate during the momentary power outage. This provides that the controller 16 will bring the associated equipment back on-line within the shortest duration time. Furthermore, by reconnecting the AC induction motor 14 to the supply voltage at a desired time (i.e., when the motor generated back emf voltage is in-phase with the supply voltage), potential equipment damage typically associated with momentary power outages are avoided.

In addition to the measurements received from the voltage sense circuit 18 and the phase detection circuit 20, other input signals such as a Run Signal 22 (from the equipment controller) and a Motor Auxiliary Contact signal 36 (from the motor starter) are input to the ride-through controller 16 for processing other operating conditions. Control signals output from the ride-through controller 16 include a Run Feedback 24 (i.e., run signal to equipment), a Ride-Through Event 26, an Unload Signal 28, a Supply Fault 30, a Motor Fault 32, a Ready-To-Start 34, and the Motor Starter Engage 38. Measured values from the supply voltages and the AC induction motor 14 as well as other input and control signals are shown in Table 1-1 through Table 1-4.

Table 1-1 includes a list of voltage and phase angle measurements required for determining control strategies for a ride-through operation. The measurements are determined using digital signal processing algorithms on high-speed sampled data acquired by the controller 16 and analog-to-digital converters.

TABLE 1-1

| SYMBOL | DESCRIPTION |
|---|---|
| $V_{sab}$ | Supply Phase A-B Voltage |
| $V_{sbc}$ | Supply Phase B-C Voltage |
| $V_{sac}$ | Supply Phase A-C Voltage |
| $V_{mab}$ | Motor Back EMF Phase A-B Voltage |
| $V_{mbc}$ | Motor Back EMF B-C Voltage |
| $V_{mac}$ | Motor Back EMF A-C Voltage |
| $V_{dab}$ | Supply Phase A-B Voltage Delta |
| $V_{dbc}$ | Supply Phase B-C Voltage Delta |
| $V_{dac}$ | Supply Phase A-C Voltage Delta |
| $F_{sab}$ | Supply Phase A-B Frequency |
| $F_{sbc}$ | Supply Phase B-C Frequency |
| $F_{sac}$ | Supply Phase A-C Frequency |
| $F_{mab}$ | Motor Back EMF Phase A-B Frequency |
| $F_{mbc}$ | Motor Back EMF Phase B-C Frequency |
| $F_{mac}$ | Motor Back EMF Phase A-C Frequency |
| $\theta_{sa}$ | Supply Phase A Angle |
| $\theta_{sb}$ | Supply Phase B Angle |
| $\theta_{sc}$ | Supply Phase C Angle |
| $\theta_{ma}$ | Motor Back EMF Phase A Angle |
| $\theta_{mb}$ | Motor Back EMF Phase B Angle |
| $\theta_{mc}$ | Motor Back EMF Phase A Angle |

Table 1-2 includes settings that are adjustable for providing the capability to optimally configure operating conditions when using different motors, equipment, and power supply devices.

TABLE 1-2

| SYMBOL | DESCRIPTION |
|---|---|
| $S_f$ | Voltage Scale Factor |
| $V_d$ | Supply Dropout Voltage |
| $V_e$ | Supply Event Voltage Delta |
| $V_r$ | Supply Reconnect Voltage |
| $V_m$ | Motor Reconnect Voltage |
| $\theta\Delta_{min}$ | Motor Reconnect Minimum Phase Delta |
| $\theta\Delta_{max}$ | Motor Reconnect Maximum Phase Delta |
| $T_{unload}$ | Time Delay From Event Start To Unload |
| $T_{stop}$ | Time For Rotation To Stop Upon Power Loss |

Table 1-3 includes digital signals that are input to a ride-through device from the controller 16 and the motor starter 38.

TABLE 1-3

| SYMBOL | DESCRIPTION |
|---|---|
| $S_{run-I}$ | Run Signal From Equipment |
| $S_{aux}$ | Motor Starter Aux Contact |

Table 1-4 includes digital control signals that are output by the ride-through device for controlling or indicating status of the AC induction motor 14 and the ride through event.

TABLE 1-4

| SYMBOL | DESCRIPTION |
|---|---|
| $S_{run-o}$ | Run Signal To Equipment |
| $S_{event}$ | Ride Through Event |
| $S_{unload}$ | Unload Equipment |
| $S_{fault-s}$ | Supply Fault (Phase Loss) |
| $S_{fault-m}$ | Motor Fault (Phase Loss) |

TABLE 1-4-continued

| SYMBOL | DESCRIPTION |
| --- | --- |
| $S_{ready}$ | Ready To Start Signal |
| $S_{motor}$ | Motor Starter Engage |

In determining whether a power outage or momentary power loss is occurring, respective measurement values and input signals identified in above tables are entered into the following logic expression:

$$\text{IF } (S_{run-i}) \text{ AND } [(V_{sab}<V_d) \text{ OR } (V_{sbc}<V_d) \text{ OR}$$
$$(V_{sac}<V_d) \text{ OR } V_{dab}>V_e) \text{ OR } (V_{dbc}>V_e) \text{ OR}$$
$$(V_{dac}>V_e)] \quad \text{EQ (2-4)}$$

The supply voltage values $V_{sab}$, $V_{sbc}$, $V_{sac}$ are determined from an integration of the sampled voltages at a rate and duration as dictated by the power supply frequency. If the resulting logic expression is true, then a control action signal $S_{event}$ (i.e., ride-through event) is output from the controller 16 while the condition is still true indicating that a power outage is present and that the power supply 10 may be disconnected from the AC induction motor 14. After a duration of time $T_{unload}$ has elapsed from the assertion of the $S_{event}$, an equipment unload signal $S_{unload}$ is provided to initiate the unloading of the equipment that is being driven by the AC induction motor 14. Unloading the equipment minimizes the loss of inertia of the AC induction motor 14 during a momentary power outage event. Also, upon assertion of the $S_{event}$, a motor starter engage control signal $S_{motor}$ is cleared thereby opening the contactor 12 to the motor starter 38. As a result, supply voltage from the power supply 10 is disconnected from the AC induction motor 14.

To re-connect the supply voltage to the AC induction motor 14 and to re-engage the AC induction motor 14 to the associated equipment while the rotor of the AC induction motor is still rotating, power must be re-connected to the AC induction motor 14 within a desired time and while the motor generated back emf voltage is in-phase with the supply voltage. Phase angle deltas $\theta\Delta_a$, $\theta\Delta_b$, $\theta\Delta_c$ used to determine whether to reconnect the supply voltage to the AC induction motor 14 are derived from the following logic expressions:

$$\theta\Delta_a = [(\theta_{ma} - \theta_{sa} - \theta_{ta} + 1080) \text{ MODULUS } 360] \text{ IF}$$
$$(\theta\Delta_a > 180) \text{ THEN } \theta\Delta_a = \theta\Delta_a - 360 \quad \text{EQ (2-2)}$$

$$\theta\Delta_b = [(\theta_{mb} - \theta_{sb} - \theta_{tb} + 1080) \text{ MODULUS } 360] \text{ IF}$$
$$(\theta\Delta_b > 180) \text{ THEN } \theta\Delta_b = \theta\Delta_b - 360 \quad \text{EQ (2-3)}$$

$$\theta\Delta_c = [(\theta_{mc} - \theta_{sc} - \theta_{tc} + 1080) \text{ MODULUS } 360] \text{ IF}$$
$$(\theta\Delta_c > 180) \text{ THEN } \theta\Delta_c = \theta\Delta_c - 360 \quad \text{EQ (2-4)}$$

where the phase angles $\theta_{ma}$, $\theta_{mb}$, $\theta_{mc}$ are derived using the measurement values of Table (1-1).

The phase target adjustment values $\theta_{ta}$, $\theta_{tb}$, $\theta_{tc}$ are derived using the following logical expressions:

$$\theta_{ta} = (((((1/F_{mab}) - (1/F_{sab})) \times 360)/(1/F_{mab})) \times T_{am})/(1/F_{sab}) \quad \text{EQ (2-5)}$$

$$\theta_{tb} = (((((1/F_{mbc}) - (1/F_{sbc})) \times 360)/(1/F_{mbc})) \times T_{am})/(1/F_{sbc}) \quad \text{EQ (2-6)}$$

$$\theta_{tc} = (((((1/F_{mac}) - (1/F_{sac})) \times 360)/(1/F_{mac})) \times T_{am})/(1/F_{sac}) \quad \text{EQ (2-7)}$$

where $F_{sab}$, $F_{sbc}$, $F_{sac}$ are supply phase frequencies and $F_{mab}$, $F_{mbc}$, $F_{mac}$ are motor generated back emf phase frequencies. The phase target adjustment values $\theta_{ta}$, $\theta_{tb}$, $\theta_{tc}$ determines the amount of time the contactor 12 must be closed prior to the supply voltage and motor generated back emf voltage synchronization. This takes into consideration and compensates for the operating time of the contactor 12. A respective target adjustment is represented as a respective phase angle relative to the supply voltage.

The supply phase voltages and the motor generated back emf voltage (or alternatively the phase angle delta) may be used in cooperation with the adjustable values from Table (1-4) for determining when to assert a control action signal for engaging the motor starter 38. The logic expression used for determining whether to output the control action signal is shown as follows:

$$\text{IF } (S_{run-i}) \text{ AND } [(V_{sab}>V_r) \text{ AND } (V_{sbc}>V_r) \text{ AND}$$
$$(V_{sac}>V_r) \text{ AND } [(V_{mab}<V_m) \text{ AND } (V_{mbc}<V_m)$$
$$\text{AND } (V_{mac}<V_m)] \text{ OR } [(\theta\Delta_a>\theta\Delta_{min}) \text{ AND}$$
$$[(\theta\Delta_a>\theta\Delta_{max}) \text{ AND } (\theta\Delta_b>\theta\Delta_{min}) \text{ AND}$$
$$[(\theta\Delta_b>\theta\Delta_{max}) \text{ AND } \theta\Delta_c>\theta\Delta_{min}) \text{ AND}$$
$$[(\theta\Delta_c>\theta\Delta_{max})]] \quad \text{EQ (2-4)}$$

EQ (2-4) states that a first condition for re-connecting the power supply 10 to the AC induction motor 14 requires that the all supply phase voltages are greater than a predetermined power supply reconnect voltage $V_r$. $V_r$ is expressed as the percentage of nominal supply voltage that defines the end of an outage event. A second condition required for re-connection is that each motor generated back emf voltage is below a predetermined motor reconnect voltage $V_m$, or alternatively, that each phase angle delta is between a motor reconnect minimum phase delta $\theta\Delta_{min}$ and a motor reconnect maximum phase delta $\theta\Delta_{max}$. The motor reconnect voltage $V_m$ is the percentage of nominal power that defines a maximum allowable motor generated back emf voltage that will not produce torque spikes if reconnected to an out-of-phase supply voltage. The motor reconnect minimum phase delta $\theta\Delta_{min}$ is defined as the minimum phase angle difference between the supply voltage and the motor generated back emf voltage at which the contactor 12 can be re-engaged. The motor reconnect maximum phase delta $\theta\Delta_{max}$ is defined as the maximum phase angle difference between the supply voltage and the motor generated back emf voltage at which the contactor 12 can be re-engaged.

If the conditions are satisfied for logical expression of EQ (2-4), then a run signal to equipment $S_{run-o}$ is asserted for re-engaging the AC induction motor 14 to the associated equipment. $S_{run-o}$ is considered asserted (active) during a ride-through event to prevent any supervisory equipment from shutting down the associated equipment. However, if the duration of time for the momentary power outage exceeds a predetermined time $T_{stop}$, then the run signal is cleared (deactivated) which provides a signal to the controller 16 that the AC induction motor 14 has stopped. $T_{stop}$ is defined as the time of rotation required to stop upon power loss. $T_{stop}$ is used to coordinate the longest time interval of an outage based on a normal shutdown of the equipment driven by the motor. In the event that the motor stops, a ready to start signal $S_{ready}$ is asserted indicating that the motor has stopped and that each phase of the supply voltage is equal to or greater than a supply dropout voltage $V_d$. The supply dropout voltage $V_d$ is the percentage of supply voltage used to define an outage event.

Other motor and supply fault signals may be provided for identifying a phase loss. A supply fault signal $S_{fault-s}$ indicates that a phase loss has occurred from the supply voltage, whereas a motor fault signal $S_{fault-m}$ indicates that a phase loss has occurred from the motor generated back emf voltage.

During a momentary power outage event, the controller 16 is required to remain active so that processing of received input information and control signals may be provided to the ride-through device and the AC induction motor 14 for controlling the ride through event. If the power supply 10 is utilized to supply voltage to the controller 16, momentary power interruptions may inhibit the controller 16 from controlling the ride-through event. To avoid momentary power interruptions to the controller 16, an interruptible power supply may be integrated to supply low voltage for maintaining power to the controller 16 and like devices required for controlling the ride through event.

Figure 2:
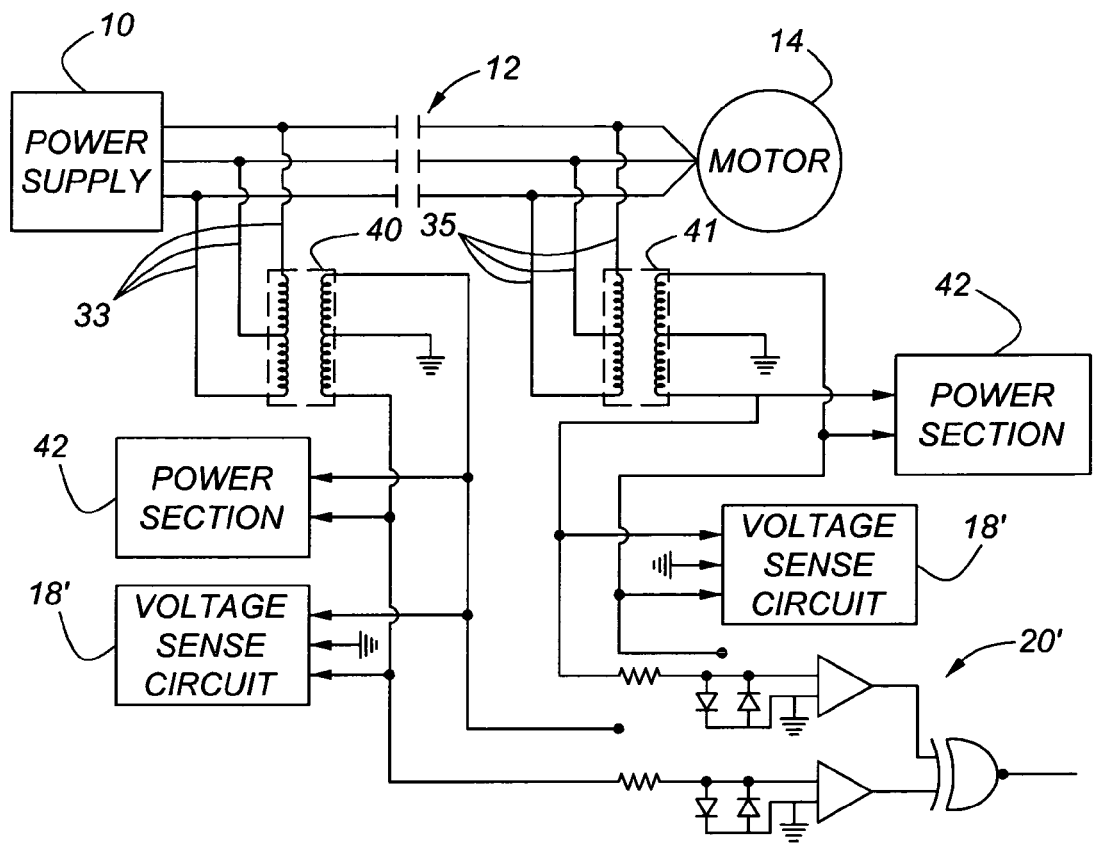
FIG. 2 is a schematic diagram of an analog circuit for providing ride-through capability to an induction motor according to a second embodiment of the present invention.

FIG. 2 through FIG. 5 illustrate alternative embodiments for detecting power outages and determining ride-through control strategy utilizing analog detection circuits. FIG. 2 illustrates a schematic of a ride-through detection circuit for sensing operating parameters for determining if a power outage is occurring and for providing control actions thereto. A plurality of sensing circuits are electrically connected to the supply voltage side and the motor input side for determining the operating parameters for detecting the momentary power outage for disconnecting the supply voltage, and for controlling the reconnection of the supply voltage to the AC induction motor 14 based on the present operating conditions. A plurality of first circuits 33 are tapped between the power supply 10 and the contactor 12 for providing supply voltage to a first step down transformer 40 for reducing the supply voltage to the plurality of sensing circuits. A plurality of second circuits 35 are tapped between the contactor 12 and the AC induction motor 14 for providing motor generated back emf voltage to a second step down transformer 41 for reducing the motor generated back emf voltage to the plurality of sensing circuits.

A voltage sensing circuit 18' senses voltage from the plurality of first circuits 33 and second circuits 35 for providing sensed signals to a controller (not shown) for determining when a momentary power outage is occurring and for providing a control signal for breaking a contactor 12 for disconnecting supply voltage to the AC induction motor 14. A phase detection circuit 20' senses the phase difference between the supply voltage and the motor generated back emf voltage for determining whether the phase of the supply voltage and motor generated back emf voltage are synchronized for reconnecting the supply voltage to the AC induction motor 14. A power regulation circuit 42 is electrically connected to the plurality of first circuits 33 and second circuits 35 for supplying regulated voltage to a controller (not shown) and other ride-through devices required for receiving and processing input and control signals for controlling the ride through event.

Figure 3:
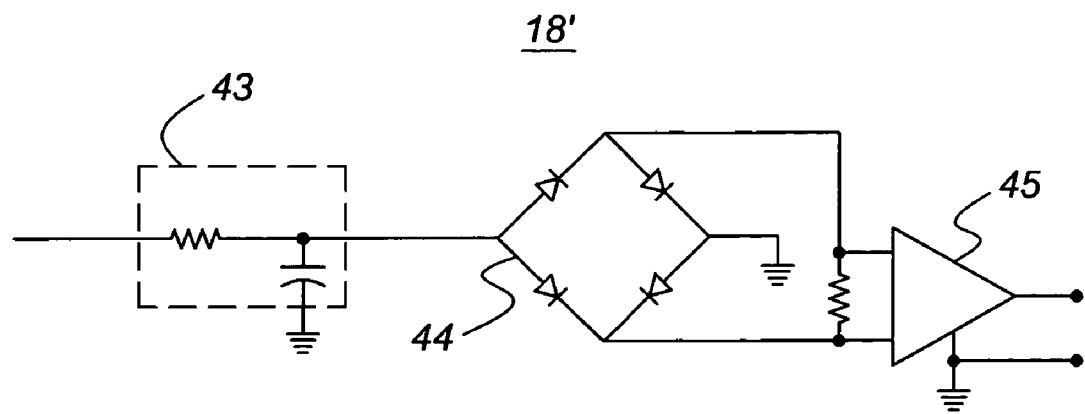
FIG. 3 is a schematic diagram of the analog voltage sense circuits shown in FIG. 2.
Figure 4:
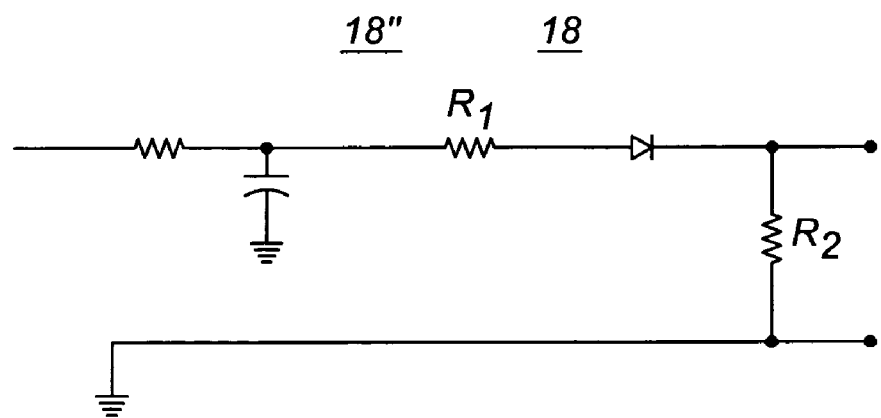
FIG. 4 is a schematic diagram of another embodiment of analog voltage sense circuits used with the circuit shown in FIG. 2.

FIG. 3 and FIG. 4 illustrate simplified voltage analog sense circuits. In FIG. 3, the voltage sensing circuit 18' includes a low pass filter 43 for reducing voltage spikes in the input voltage. A full-wave rectified circuit 44 is provided for supplying a rectified output to a differential amplifier 45. In the preferred embodiment, the rectified output is two diode drops less than the input voltage, however, the determining factor for the detecting the momentary power outage is detecting a specific voltage level as opposed to a specific voltage drop from the input voltage. The output signal is filtered and read one time. Alternatively, the output signal may be sampled at 10–100 times/cycle and the maximum sample reading may be utilized.

FIG. 4 illustrates another preferred embodiment for sensing the voltage using a voltage sensing circuit 18". The output voltage is a half wave output. The peak of the of the voltage output is determined by the following formula:

$$\frac{R_2}{R_1 + R_2} * V_{in} - V_d$$

where samples are taken continuously throughout the cycle and the maximum reading is utilized for determining the voltage output. The voltage output is attenuated to match the A/D input by dividing the voltage by a desired amount utilizing the resistive network.

Figure 5:
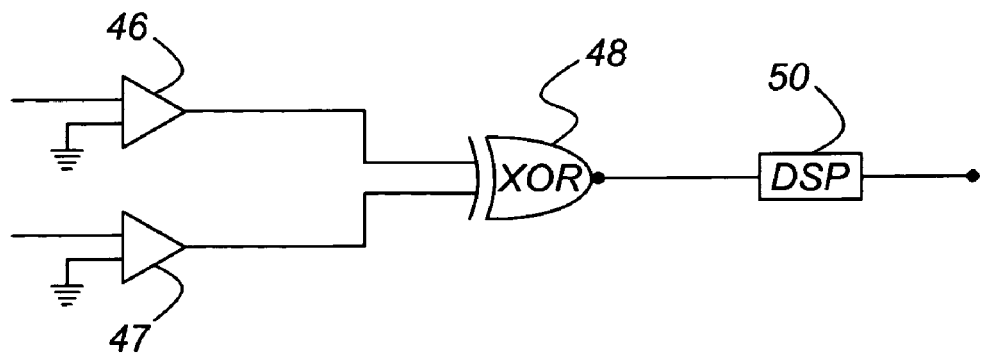
FIG. 5 is a schematic diagram of the phase detection circuit shown in FIG. 2.

FIG. 5 illustrates a phase detection circuit 20' for determining the phase relationship between the supply voltage and the motor generated back emf voltage. A first input voltage from the supply voltage and a second input voltage from the motor generated back emf voltage are input to a first comparator circuit 46 and a second comparator circuit 47 to condition each signal for determining whether each respective signal is in-phase with one another. After each input voltage is conditioned to a respective logic value (e.g., 1 or 0), the conditioned signals are input to a XNOR logic gate 48. The XNOR logic gate 48 outputs a signal indicative of whether the first and second input signals are in-phase (i.e., if both conditioned output signals are of the same value) or out-of-phase (i.e., both conditioned signals are not of the same value). The output value from the XNOR logic gate 48 is input to a processing circuit 50 such as a digital signal processor for signal processing. Alternatively, the processing circuit 50 may include an analog low pass filter for signal processing. The analog filter may be used for signal processing if the phase relation is changing at a slow rate. If the phase relation is changing at a fast rate, then time-on digital processing may be utilized. For example, the voltage output of the XNOR logic gate 48 may be sampled at a high rate of 600–6000/sec for a signal cycle interval. The samples retrieved are summed and then divided by the number of samples. The result will be between 0% to 100%. The percentage can then be correlated to a phase difference of 0° to 180°. A result of 100% correlates to a 0° phase difference (in-phase). A 0% correlates to a 180° phase difference (out-of-phase). The following table is an example of respective percentages correlated to the respective phase differential.

| Percentage | Phase Differential |
|---|---|
| 0% | 180° |
| 25% | 135° |
| 50% | 90° |
| 75% | 45° |
| 100% | 0° |

Alternatively, both comparators may be sampled at a high rate (e.g., 100/cycle or 6000/sec). For each cycle, the number of samples are counted where the polarity is the same. The resulting count is from 0 to 100 which correlates from a 0° to 180° phase difference.

Figure 6:
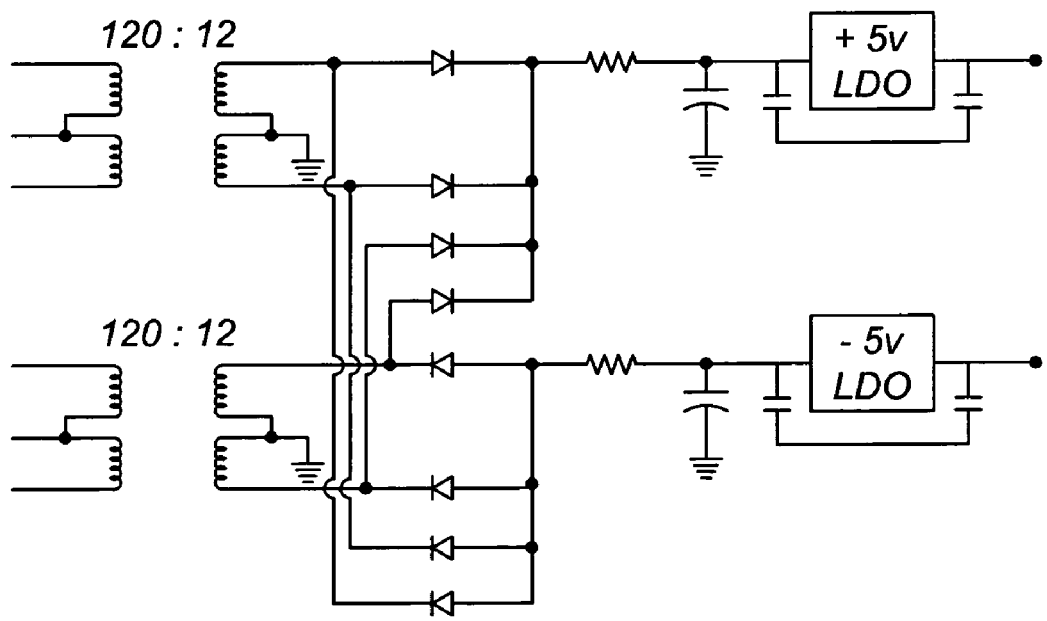
FIG. 6 is a schematic diagram of the power section circuits shown in FIG. 2.

FIG. 6 illustrates the power circuit 42 for providing an uninterruptible power supply to the controller and other low voltage control devices in the event of a momentary power outage. In this embodiment, the supply voltage and the motor generated back emf voltage are used to provide power to a regulating source which supplies a regulated voltage to the controller (not shown) and other devices requiring regulated voltage during periods of momentary power loss.

The supply voltage received from a power supply and motor generated back emf voltage is stepped down from a 120V to 12V. A low pass filter may be used on the 12V input to reduce voltage spikes. The filtered 12V supply is provided to the regulating source such a set of low dropout regulators. The low dropout regulator is used to supply a regulated low voltage uninterruptible power supply (e.g., +/−5V@100 ma) to the control circuitry during periods of power fluctuation.

Utilizing the analog detection circuits as discussed in FIG. 2-6, various sensed signals are input to the controller for determining whether the contactor 12 can be closed for reconnecting the supply voltage to the AC induction motor 14. A first condition required for re-connecting the power supply 10 to the AC induction motor 14 requires that the supply voltage is greater than a predetermined percentage of the nominal voltage of all phases (e.g., each supply line voltage is greater than 90% nominal voltage). This determination insures that the momentary outage event has ended. A second condition required for re-connection is that the generated back EMF of the AC induction motor 14 is below a predetermined percentage of the nominal voltage. Alternatively, the second condition required for reconnecting the supply voltage may provide that the motor generated back emf voltage is in-phase with the power supply line voltage (i.e., in-phase or +/− a predetermined percentage of the phase relationship).

A predetermined time constant, as discussed earlier, allows the AC induction motor 14 to be re-engaged at the proper time for phase synchronization while accounting for the amount of time required for engaging the motor starter 38.

Figure 7:
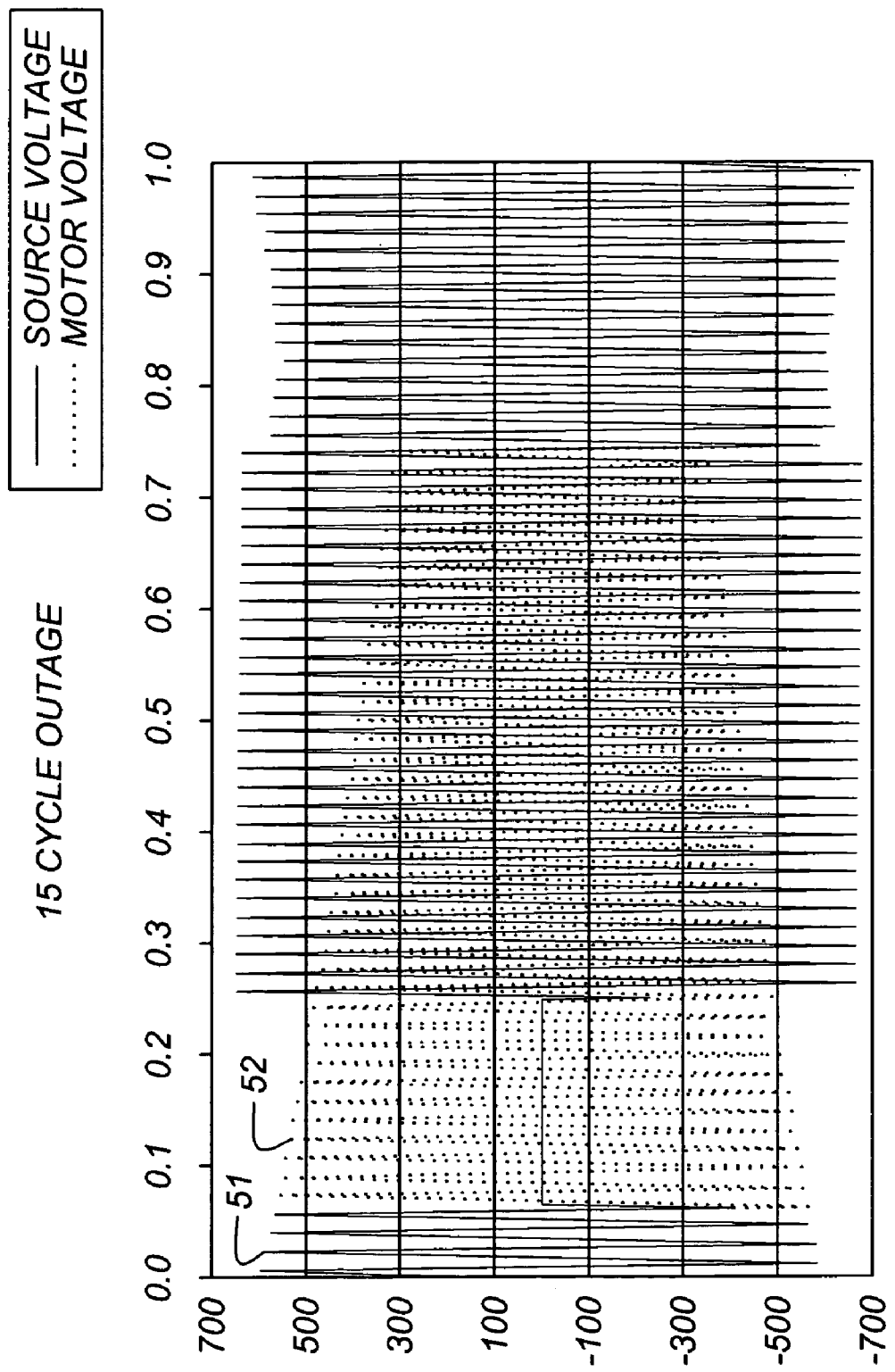
FIG. 7 is a waveform diagram showing source voltage and motor voltage with a cycle source power outage.

FIG. 7 shows a waveform diagram of a source voltage and a resulting motor voltage for a power outage event of approximately fifteen cycles. The source voltage is shown in solid line 51 and falls to a zero magnitude at about 0.05 second on the time scale. The power outage is over at about 0.25 second on the time scale at which time the source voltage recovers to full magnitude. The motor voltage is shown in dashed line 52 and tracks the source voltage until the beginning of the power outage. When the source voltage 51 falls to zero magnitude, the motor voltage 52 then begins to decay as the motor slows down while functioning as a generator generating back emf. The motor is reconnected to the power source after about 44.6 cycles from the outage, which is the first re-alignment of the voltage waveforms 51 and 52.

Figure 8:
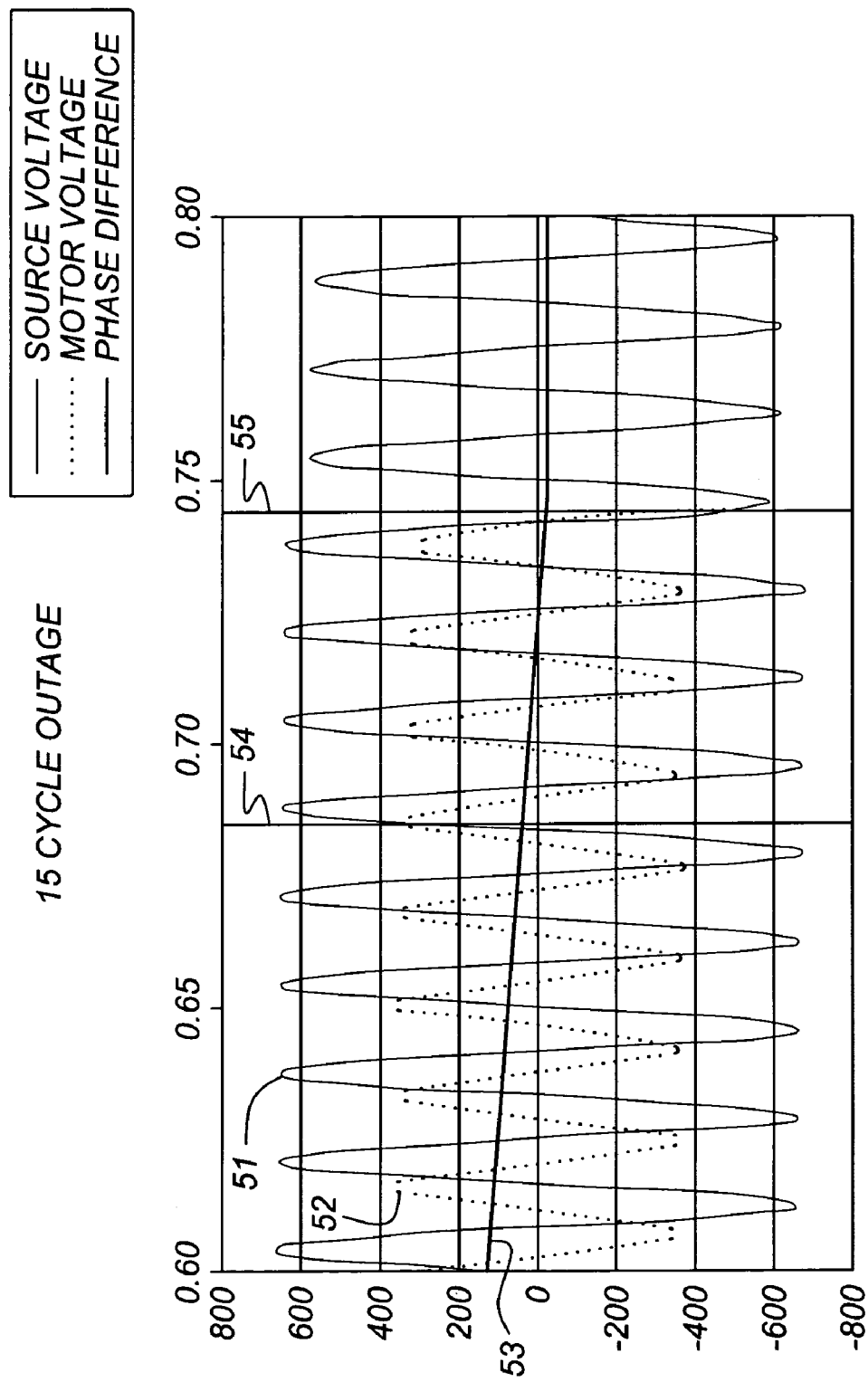
FIG. 8 is a waveform diagram of a reconnect portion of the waveform shown in FIG. 7 showing source voltage, motor voltage and phase difference.

FIG. 8 is an enlargement of the reconnect portion of the source voltage 51 and motor voltage 52 waveforms shown in FIG. 7 with a waveform 53 of the phase difference between the voltages. The magnitude of the phase difference 53 decreases with time to a zero magnitude at about 0.75 second. Because the contactor has an actuation delay or operating time, for example of approximately 3.6 cycles (0.06 second), the contactor is energized at an "contactor energized" time 54 that is prior to the phase difference 53 becoming zero. The "contactor energized" time 54 is a function of the rate of decay of the phase difference 53 and the contactor operating time. The contactor closes at a "contactor closed" time 55 that coincides with, or is close to, the zero magnitude of the phase difference 53. In the example shown, the frequency of the source voltage 51 is "60 Hz" and the frequency of the back emf (motor voltage 52) at the "contactor energized" time 54 is "57.68 Hz" with a phase difference of approximately 50.1 degrees.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling ride through of an induction motor comprising the steps of:
   a) detecting a power loss from a power supply connected to the induction motor by comparing one of a supply phase voltage with a predetermined supply dropout voltage value and a supply phase voltage delta with a predetermined supply event voltage delta;
   b) disconnecting the induction motor from the power supply when the supply phase voltage is less than the predetermined supply dropout voltage value or the supply phase voltage delta is greater then the predetermined supply event voltage delta;
   c) monitoring a line voltage of the power supply;
   d) monitoring a back emf voltage generated by the induction motor;
   e) monitoring a phase differential between the line voltage and the back cuff voltage;
   f) determining whether the monitored voltages are within a predetermined voltage limit;
   g) determining whether the phase differential is within a predetermined phase limit; and
   h) re-connecting the power supply to the induction motor in response to the monitored voltages being within the predetermined voltage limit and the monitored phase differential being within the predetermined phase limit.

2. The method according to claim 1 wherein the power supply provides and the induction motor operates on three phase alternating current electrical power and said steps c) and d) are performed for each of the three phases.

3. The method according to claim 1 including providing a microprocessor and operating the microprocessor to perform said steps f) and g).

4. The method according to claim 1 wherein said steps b) and h) are performed by opening and closing respectively motor starter contacts.

5. The method according to claim 1 including determining a phase target adjustment value representing an amount of time to compensate for an operating time of a contactor connected between the power supply and the induction motor.

6. The method according to claim 1 wherein said step h) is performed when the supply phase voltage is greater than a predetermined supply reconnect voltage and a motor back emf voltage is less than a predetermined motor reconnect voltage.

7. The method according to claim 1 wherein said step h) is performed when a phase angle delta is greater than a predetermined motor reconnect minimum phase delta and the phase angle delta is less than a predetermined motor reconnect maximum phase delta.

8. The method according to claim 1 including generating a run signal during a ride through event to prevent a supervisory equipment controller from shutting down equipment coupled to the induction motor.

9. The method according to claim 1 including generating a ready to start signal when the induction motor is stopped and all phases of the power supply voltage are equal to or greater than a predetermined supply dropout voltage.

10. An apparatus for controlling ride through of an induction motor comprising:
    voltage sensing means adapted to be connected to power lines between a power supply and an induction motor; and control means connected to said voltage sensing means and adapted to control contactors in the power lines whereby when said voltage sensing means is connected to the power lines and said control means is connected to the contactors, said control means responds to a power loss detected by comparing one of a supply phase voltage with a predetermined supply dropout voltage value and a supply phase voltage delta with a predetermined supply event voltage delta by said voltage sensing means by operating the contactors to disconnect the power supply from the induction motor when the supply phase voltage is less than the predetermined supply dropout voltage value or the supply phase voltage delta is greater than the predetermined supply event voltage delta, and said voltage sensing means monitors a line voltage of the power supply, a back emf voltage generated by the induction motor and a phase differential between the line voltage and the back emf voltage such that said control means re-connects the power supply to the induction motor when the monitored voltages are within a predetermined voltage limit and the monitored phase differential is within a predetermined phase limit.

11. The apparatus according to claim 10 wherein said voltage sensing means includes a supply voltage sensing circuit for monitoring the line voltage and a motor voltage sensing circuit for monitoring the back emf voltage.

12. The apparatus according to claim 11 wherein at least one of said supply voltage sensing circuit and said motor voltage sensing circuit includes a low pass filter, a fill-wave rectified circuit and a differential amplifier for generating an output signal representing monitored voltage.

13. The apparatus according to claim 11 wherein at least one of said supply voltage sensing circuit and said motor voltage sensing circuit includes a circuit for generating a half wave output signal representing monitored voltage.

14. The apparatus according to claim 10 wherein said voltage sensing means includes a phase detection circuit for monitoring a phase of the line voltage and a phase of the back emf voltage.

15. The apparatus according to claim 14 wherein said phase detection circuit includes first and second comparator circuits receiving the line voltage and the back emf voltage respectively and an XNOR logic gate receiving outputs from said first and second comparator circuits for generating in-phase and out-of-phase signals.

16. The apparatus according to claim 10 including an uninterruptible power supply connected between said control means and at least one of the power supply and the induction motor for supplying electrical power to said control means during a power loss.

17. A method for controlling ride through of an induction motor comprising the steps of:
a) detecting a power loss from a power supply connected to the induction motor by comparing one of a supply phase voltage with a predetermined supply dropout voltage value and a supply phase voltage delta with a predetermined supply event voltage delta;
b) disconnecting the induction motor from the power supply when the supply phase voltage is less than the predetermined supply dropout voltage value or the supply phase voltage delta is greater than the predetermined supply event voltage delta;
c) monitoring a line voltage of the power supply;
d) monitoring a back emf voltage generated by the induction motor;
e) monitoring a phase differential between the line voltage and the back emf voltage;
f) determining a rate at which the phase differential is approaching a zero magnitude; and
g) energizing a contactor to re-connect the power supply to the induction motor at a predetermined contactor energized time prior to the phase differential reaching zero magnitude corresponding to an operating time of the contactor.

18. The method according to claim 17 including selecting the contactor energized time such that a contactor closed time is prior to the phase differential reaching zero magnitude.

* * * * *